Oct. 13, 1953     F. M. OWNER     2,654,993
GAS TURBINE ENGINE WITH MULTIPLE TURBINES
Filed Sept. 16, 1949
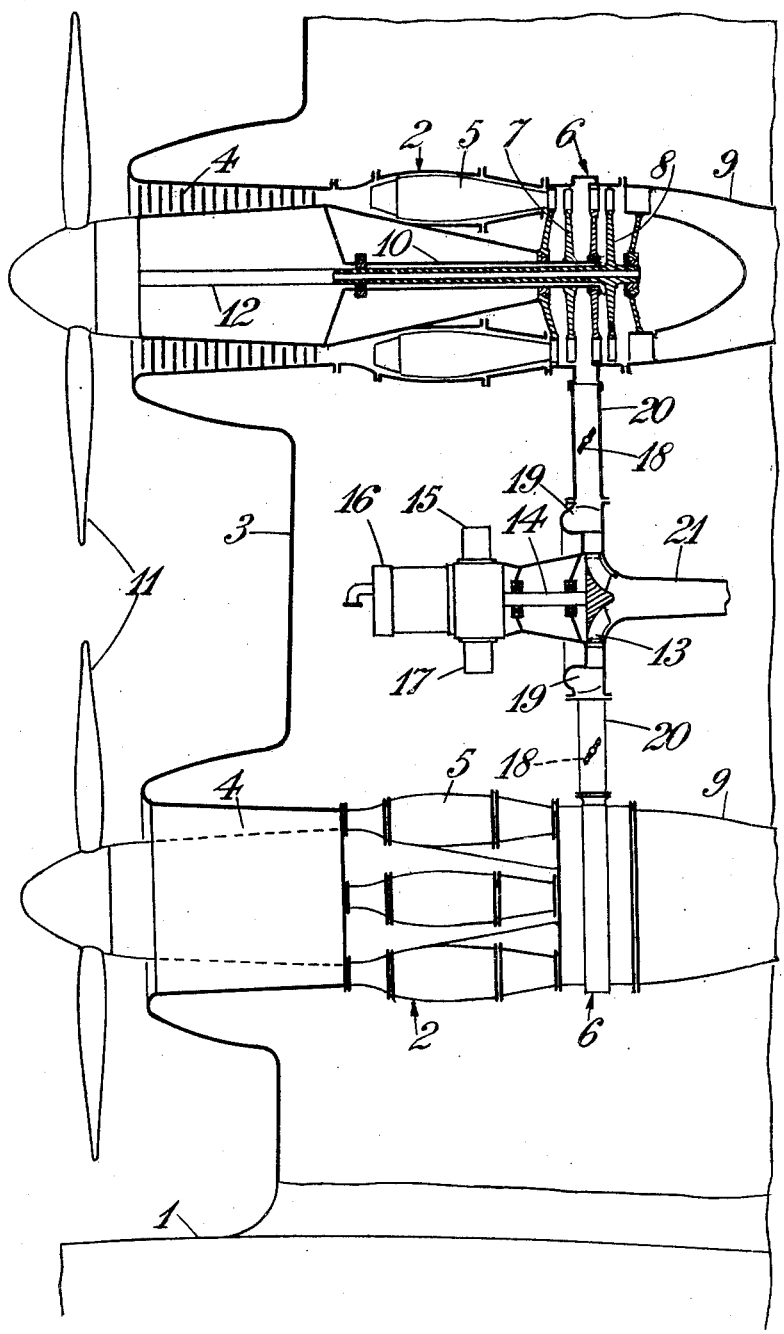
INVENTOR
FRANK M. OWNER
BY Wilkinson & Mawhinney
ATTORNEYS Patented Oct. 13, 1953

2,654,993

UNITED STATES PATENT OFFICE 2,654,993

GAS TURBINE ENGINE WITH MULTIPLE TURBINES

Frank Morgan Owner, Bristol, England, assignor to The Bristol Aeroplane Company Limited, Bristol, England, a British company Application September 16, 1949, Serial No. 116,148
In Great Britain September 27, 1948

3 Claims. (Cl. 60—39.16)

1

This invention concerns gas-turbine engines and has for its object to provide an improved arrangement for driving accessories required either for the operation of the engine or of a vehicle in which it is installed.

Another object of this invention is to reduce or eliminate the need for duplicating accessories in a multi-engine installation.

A further object of this invention is to simplify the transmission system between the engines and the accessories for use in the engine installation.

According to this invention a gas-turbine engine comprising a main turbine having a pair of independently rotating rotors through which the gases pass in succession is characterised in that an auxiliary turbine is provided to drive engine or other accessories and that the auxiliary turbine is driven by gases drawn off from between the rotors of the main turbine.

According to a feature of this invention the auxiliary turbine is connected to a pair of gas turbine engines as indicated so that it may be driven by gases drawn off from either or both engines.

According to a further feature of this invention in a gas-turbine engine having a separate compressor-driving rotor the gases are withdrawn from the engine after the said rotor thereby avoiding mis-matching of the compressor and its turbine. It is preferred that the gases be withdrawn after the compressor-driving rotor and before the power rotor.

Preferably the auxiliary turbine is of the centripetal type. The advantage of using this form of turbine is that it is suitable for small power output and can be adapted to form a constant-speed drive which is necessary for certain forms of accessories.

A practical application of the invention will now be described, by way of example only, with reference to the accompanying drawing which diagrammatically shows an engine installation in accordance with this invention.

Referring to the drawing: a multi-engine aeroplane 1 has a pair of gas-turbine engines 2 mounted in a wing 3. Each engine comprises an axial-flow compressor 4, combustion equipment 5 and an axial-flow turbine 6 each having a pair of independent rotors 7, 8 through which the combustion gases pass in succession. The gases are discharged as a rearwardly-directed jet from a jet pipe 9 to assist in propulsion. The first-stage turbine rotor 7 is coupled to the compressor 4, by shaft 10, to drive it and the second-stage rotor 8 drives a propeller 11 through shaft 12.

2

The engines 2 extend chordwise of the wing 3 and are spaced apart. In the space between the engines there is disposed an auxiliary turbine 13 of the centripetal type which is coupled by shaft 14 to engine and/or aircraft accessories 15, 16 and 17 to drive them.

The centripetal turbine is particularly suitable for driving accessories in view of its small power output and because it may be readily controlled by a simple valve arrangement to give constant rotational speed.

A gas collector 19 surrounds turbine 13 and is connected to the turbine 6 of each engine 2 by a pipe 20. The pipe communicates with the space between the stages 7, 8 of the turbine 6 and a valve 18 is provided to control the flow of gases from the engine 2 to the collector 19 and thence to the auxiliary turbine. The valves 18 may be independently or conjointly controlled either manually or automatically and may be interconnected with a known form of constant speed control apparatus.

The gases leaving the auxiliary turbine are conveyed to the trailing edge of the wing by a gas pipe 21 and are there discharged to assist propulsion.

An advantage of drawing off gases to drive the auxiliary turbine from between the stages of the engine turbines is that there is little or no possibility of spoiling the compressor-turbine matching as would occur were the gases to be drawn from in front of the first-stage turbine 7.

The auxiliary turbine 13 may be driven by the gases from either engine so that the accessories are still in operation when one engine is put out of commission. With this arrangement duplication of drive to the accessories is avoided and greater freedom of choice of location and type of auxiliary system is permitted. With the engine installation described an efficient utilization of the gases driving the auxiliary turbine is obtained.

I claim:

1. A gas turbine power plant comprising at least two turbine engines each of which comprises a compressor, combustion equipment which receives air from the compressor and in which fuel is burnt, and a main turbine which receives the gases from the combustion equipment and comprising a pair of independently-rotating rotors one of which is adapted to drive the compressor, said rotors being operatively associated in series with the compressor rotor positioned upstream of the other of said rotors so that the gases from the combustion equipment pass first through the compressor rotor and then through said other rotor, an auxiliary turbine mechanically independent of said turbine engines, and means for withdrawing gases from said turbine engines at a point between the rotors thereof and supplying the gases to said auxiliary turbine.

2. A gas turbine power plant as claimed in claim 1 wherein said means comprises a separate independent duct connecting the auxiliary turbine to each of said turbine engines.

3. A gas turbine power plant as claimed in claim 2 wherein valve means are provided in each duct for independently regulating the flow of gases from each turbine engine to the auxiliary turbine.

FRANK MORGAN OWNER.

References Cited in the file of this patent

UNITED STATES PATENTS

| Number | Name | Date |
|---|---|---|
| 2,085,761 | Lysholm | July 6, 1937 |
| 2,095,991 | Lysholm | Oct. 19, 1937 |
| 2,418,911 | Smith | Apr. 15, 1947 |
| 2,465,099 | Johnson | Mar. 22, 1949 |
| 2,474,582 | Jung | June 28, 1949 |
| 2,476,179 | Cameron | July 12, 1949 |
| 2,587,057 | McVeigh | Feb. 26, 1952 |

FOREIGN PATENTS

| Number | Country | Date |
|---|---|---|
| 620,680 | France | Jan. 22, 1927 |
| 213,793 | Switzerland | Mar. 15, 1941 |